United States Patent [19]

Baker

[11] 4,134,503
[45] Jan. 16, 1979

[54] DUMPING APPARATUS FOR OPEN TOP VEHICLES

[75] Inventor: Charles J. Baker, Portland, Oreg.

[73] Assignee: Royal Industries, Inc., Pasadena, Calif.

[21] Appl. No.: 822,551

[22] Filed: Aug. 8, 1977

[51] Int. Cl.² .................................................. B65G 67/24
[52] U.S. Cl. .................................... 214/46.3; 214/52 R
[58] Field of Search ............... 214/46.22, 46.24, 46.28, 214/46.3, 46.32, 46.34, 47, 49, 52 R, 52 B, 52 C, 502; 296/11

[56] References Cited
U.S. PATENT DOCUMENTS

| | | | |
|---|---|---|---|
| 3,107,797 | 10/1963 | McFeaters et al. | 214/185 C |
| 3,631,998 | 1/1972 | Fowell | 298/11 |

*Primary Examiner*—Albert J. Makay
*Attorney, Agent, or Firm*—Klarquist, Sparkman, Campbell, Leigh, Hall & Whinston

[57] ABSTRACT

Open top vehicles are dumped by an apparatus including a vehicle receiver having stanchions on either side supporting hold-down means for clamping the vehicle against the deck of the receiver. The receiver is pivotally connected along one side to bolsters which in turn are pivoted to rigid supports. Lift cylinders are arranged to rotate the bolsters about the support to elevate the reciever and vehicle thereon. Tilting cylinders are arranged between the bolsters and the receiver for tilting the latter about the bolster to effect tilting of the vehicle into a position wherein contents can dump from the open top thereof.

5 Claims, 3 Drawing Figures

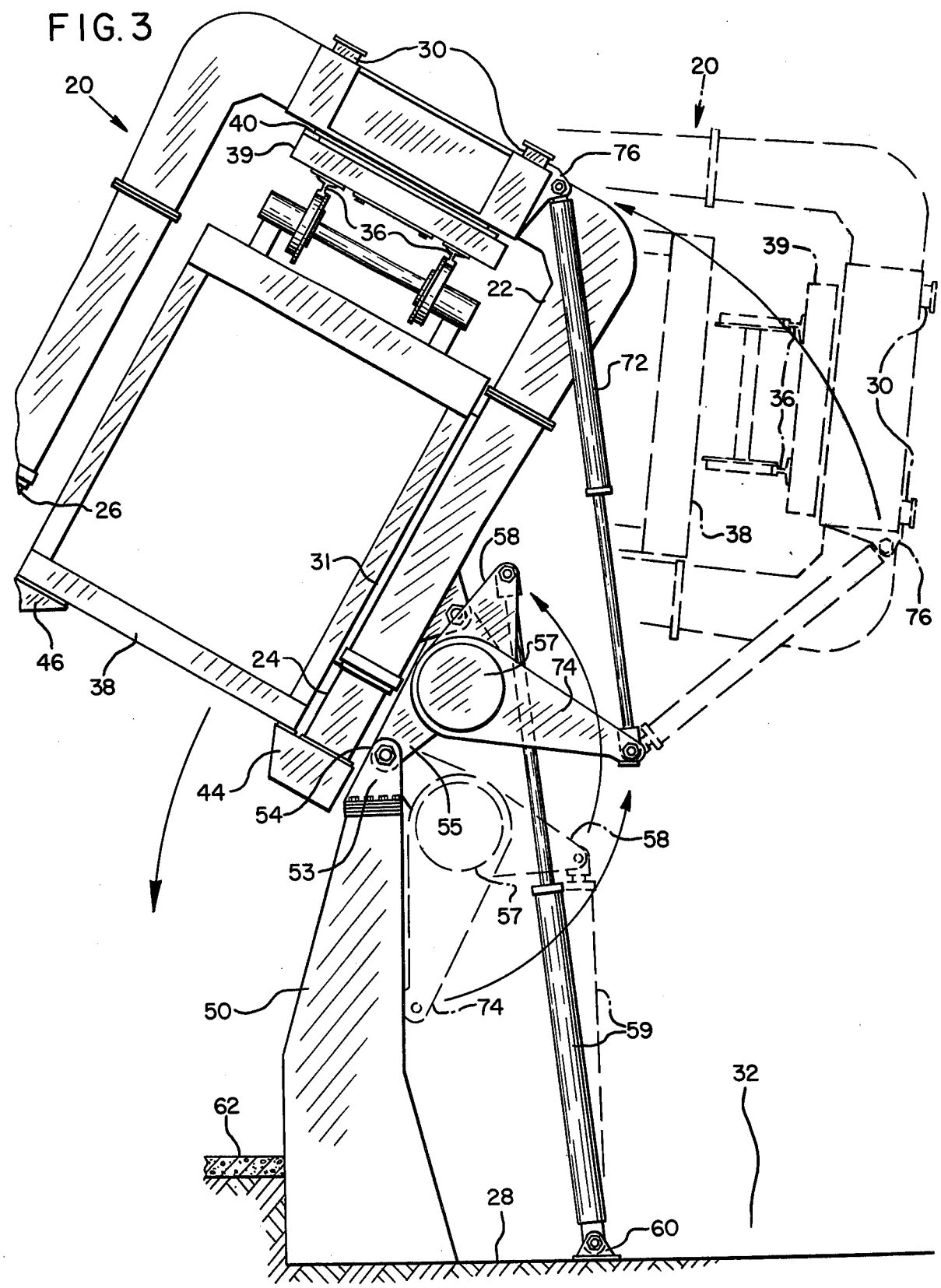

DUMPING APPARATUS FOR OPEN TOP VEHICLES

BACKGROUND OF INVENTION

The present invention relates to apparatus for dumping open top vehicles. More particularly, the invention relates to apparatus for dumping open top vehicles that is less complicated than those heretofore provided and which does not require the provision of deep receiving pits for the contents of the car.

Because of the resulting economies, many devices have been devised for tilting or dumping vehicles, such as trucks or railcars which handle bulk materials, such as coal, coke, wood chips, or the like.

Some devices provided heretofore position a vehicle to be dumped inside of a cradle which is then rotated so as to dump the contents of the car to a position beneath it. Such a system requires provision of a deep pit and installation of a conveyor mechanism in the pit and, in general, has a high installation cost. Other devices have been provided for tilting a car to one side, but emptying of a car is slow and generally requires auxiliary apparatus to clear entirely the car of its contents.

It is an object of the present invention to provide a vehicle dumping apparatus that can be constructed with a minimum of cost.

More particularly, it is an object of the present invention to provide a vehicle dumping apparatus that requires a minimum of excavation.

Still another object of the invention is to provide a railcar dumping apparatus that does not require specialized conveying equipment for removing the material dumped from a car.

A further object is to provide an apparatus that can empty an open top car quickly and entirely of its contents.

Still other objects and advantages of the invention will become more apparent here and after.

SUMMARY OF THE INVENTION

The dumping apparatus of the present invention includes a receiver upon which a vehicle such as a railcar is positioned prior to dumping. The receiver includes a deck having stanchions along the opposite sides and preferably means are provided for bringing the vehicle into contact with the stanchions along one side before any tipping movement is started. Hold-down means are provided on the stanchions to be brought into contact with the top of the vehicle and to clamp it firmly against the deck. Bolsters are provided along the stanchions on the one side of the deck, which bolsters are pivotally connected to rigid support means supported from the ground adjacent the stanchions. Lift cylinders extend between the ground and the bolsters to effect rotation of the bolsters about the support means thus to elevate and partially tip the vehicle. Further lift cylinders are provided between bolsters and the receiver for effecting rotation of the receiver about the stanchions to bring the vehicle into full dumping position. The contents of the vehicle can fall from it onto a receiving pad which is at ground level adjacent the receiver, and no special pit has to be provided for receiving such contents. They can be removed from the receiving pad by any suitable means, such as a front-end loader or, of course, a continuously operating conveyor could be provided to receive dumped material.

DRAWINGS

FIG. 3 is an end elevation showing the position of the components during the dumping of a railcar.

A DETAILED DESCRIPTION OF THE INVENTION

Figure 1:
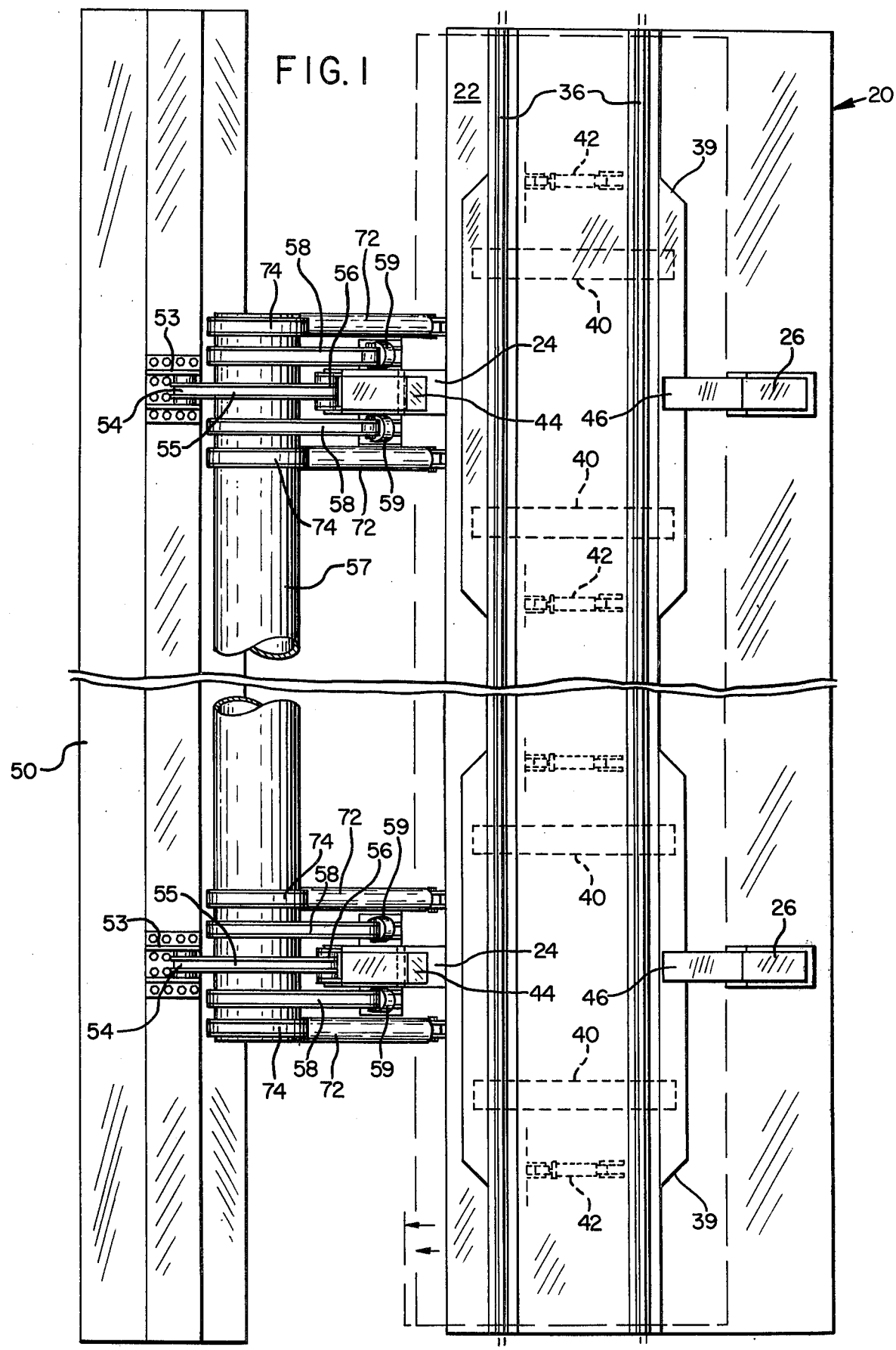
FIG. 1 is a fragmentary plan view of an apparatus constructed in accordance with the invention.

The invention is illustrated in connection with apparatus for dumping a railcar. Such apparatus includes an elongated receiver 20 which includes a deck 22 having a plurality of stanchions 24 along one side and a plurality of stanchions 26 along the other side thereof. The deck is supported in a horizontal position from a suitable concrete base 28 by columns 30 positioned at intervals beneath the deck. A relatively shallow pit 32 is provided to receive the deck 22 such that a railcar can be moved on and off the deck from ground-level trackage.

Figure 2:
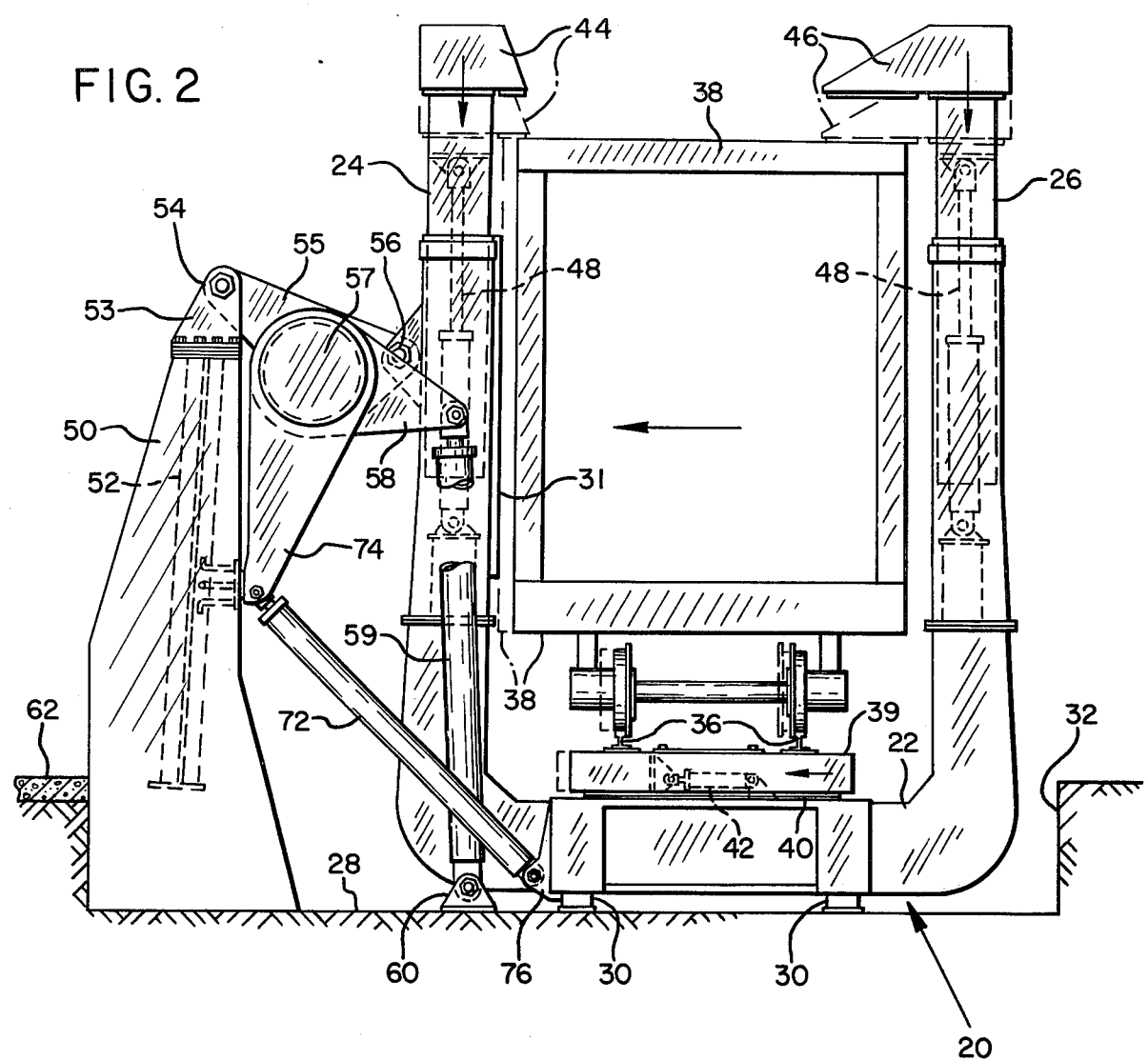
FIG. 2 is an end elevation of the same.

A pair of rails 36 extend the length of the deck for receiving a car indicated at 38 to be dumped thereon. Preferably the rails are mounted so that they can be shifted laterally from a position shown in solid lines in FIG. 2, wherein the car 38 is centered with respect to the stanchions and can be moved freely on and off the deck, to a second position shown in dotted lines in FIG. 2 wherein the car is brought into engagement with the stanchions 24 which may be provided with wood protective liners 31. The purpose for this shifting will become clear as the description proceeds. To enable this movement, the rails are mounted on a movable frame 39 which is adapted to slide laterally of the deck 22 on fixed slide plates 40 on the deck. A plurality of pistons and cylinders 42 are provided connected between the deck 22 and the frame 39 to effect the sliding movement.

Means are provided to hold the railcar in position on the deck during the dumping operation. Such means comprise a plurality of clamps 44, 46 mounted on the stanchions 24, 26, respectively, and adapted to engage the adjacent top edges of the top of the car. Means are provided so that the clamps can be raised and lowered relative to a car on the deck 22. Such means may comprise a plurality of pistons and cylinders 48. Thus, when a car is to be moved on or off the platform, the clamps 44, 46 are raised to the elevated position shown in solid lines FIG. 2. During dumping operation, the clamps are lowered to the dotted-line position shown in FIG. 2 firmly to secure the car 38 against the rails 36 and prevent any movement of the car during the dumping action.

Adjacent the pit 32 is constructed a rigid support wall or member 50 that will have sufficient strength to hold a loaded car in the elevated position and withstand the stresses imposed thereon during the lifting and tilting movement thereof. The wall 50 may comprise a reinforced concrete structure having a pair of beams 52 imbedded therein to the top of each of which a pivot bracket 53 is mounted. Pivotally connected by suitable pivot bearing structures 54 to the pivot brackets 53 are a pair of bolsters 55. The bolsters extend outwardly from the support wall 50 and are pivotally connected by bearings 56 to the stanchion structures 24 at a point about half the distance between the bottom and the top of a railcar to be dumped. Extending through and rigidly connected to the bolsters 55 is a shaft 57.

Means are provided to cause the bolsters 55 to pivot about the pivot bearings 54. Fixed to the shaft 57 one on each side of a bolster 55 is a pair of lever arms 58. To the end of each arm is connected the piston rod of a piston and cylinder 59, the cylinder being connected to a bracket 60 mounted on the floor of the pit 32. As will be apparent, extension of the piston and cylinders 59 will cause the bolsters 55 to rotate about their pivot mounts 54 thereby elevating the receiver 20 and car thereon. Preferably the bolsters rotate through an angle of not more than about 90° since any further rotation shortens the effective length of the lever arms 58 thereby requiring greater capacity of the piston and cylinders 59. In the preferred embodiment illustrated, the bolsters 55 are rotated from the dotted line position shown in FIG. 3, through an angle of about 85° to the solid line position of FIG. 3. At the latter position of the bolsters 55, the receiver 20 is in the dotted line position shown in FIG. 3.

The length of the bolsters 55 between the pivot bearings 54 and 56 should be such that the top of a car 38 is moved past the support wall 50 as the angle of repose of the car contents is reached so that the car contents that begin to spill out of a car will fall on the far side of the wall 50. Thus, the length of the bolster between the bearings 54, 56 should be no greater than and preferably less than the distance between the pivot bearings 56 and the top of the cars 38 to be dumped. A pad 62 is provided on the far side of the wall to receive the contents of the car as they spill out.

Means are also provided for rotating the receiver 20 with respect to the bolsters 55 to further tilt the receiver. Such means comprise a plurality of pistons and cylinders 72. Such pistons and cylinders are connected at one end to lever arms 74 fixed to the shaft 57 and at their opposite ends to brackets 76 at the lower adjacent edge of the receiver 20. Extension of the piston and cylinders 72 causes the receiver to rotate from the dotted line position FIG. 3 to the solid line position or through an angle of about 60° whereby the contents of the car 38 may fall freely therefrom.

Suitable hydraulic supply means of a conventional nature is provided for supplying fluid to the pistons and cylinders at the appropriate times. It is felt to be within the skill of the art to supply the same and such a system will not be described herein.

Operation

At the beginning sequence of operation of the device of the invention, the clamps 44, 46 are raised to their elevated position and a railcar 38 moved onto the receiver 20. The car is then shifted by means of the shifting pistons and cylinders 42 to bring the car into contact with the stanchions 24. Thereafter, the clamps 44, 46 are lowered by operation of the pistons and cylinders 48 to clamp the railcar firmly in the position shown in FIG. 2. When this has been completed, the pistons and cylinders 59 are operated to cause the bolsters 55 to rotate about the pivot bearings 54 elevating and tipping the receiver and railcar thereon. When the receiver 20 reaches the dotted line position shown in FIG. 3 with the cylinder and pistons 59 fully extended, the piston and cylinders 72 are extended to cause the receiver to rotate about the pivot bearing 56. When the piston and cylinders 72 are fully extended, the railcar is in its substantially fully dumped position shown in solid lines in FIG. 3 whereby all of the contents thereof can fall upon the receiving pad 62. After all the contents are removed, the piston and cylinders 59 and 72 are retracted to bring the receiver back to the position shown in FIG. 2. Thereafter the clamps 44, 46 are raised, the rails 36 brought back into alignment with the tracks from which the railcar was brought onto the device and the car removed and the next car moved into position for a repeat of the above operation.

Obviously, instead of dumping the contents upon a concrete pad, a conveyor system of suitable type may be utilized to convey away the material dumped from a railcar.

It will be observed that the dumping apparatus of the invention requires only a very shallow excavation and that the components thereof are of uncomplicated construction and relatively foolproof. Also, the car 38 to be dumped is rotated through about 150° so that the walls of the car are at an angle of about 30° to the vertical such that car contents will fall freely and completely from the car. While the apparatus has been illustrated for dumping of railcars, it should be apparent that it can be easily modified for use in dumping open top truck trailers and like vehicles.

Having illustrated and described the preferred embodiment of the invention, it should be apparent to those skilled in the art that it permits a modification in arrangement and detail.

I claim:

1. Apparatus for dumping an open top vehicle comprising an elongated vehicle receiver including a vehicle support deck, clamping means for clamping a vehicle rigidly to said deck, rigid support means adjacent said receiver extending above the elevation of said deck, bolster means extending between said receiver and said support means and pivotally connected to each, means for rotating said bolster means about said support means to effect elevation of said receiver relative to said support means, and means for rotating said receiver with respect to said bolster means when said receiver is in elevated position in the direction of said support means to effect dumping of said vehicle on the opposite side of said support means.

2. Apparatus for dumping an open top vehicle of predetermined minimum height comprising an elongated vehicle receiver including a vehicle support deck, clamping means for clamping a vehicle rigidly to said deck, rigid support means adjacent said receiver extending above the elevation of said deck, bolster means extending between said receiver and said support means and pivotally connected to each, means for rotating said bolster means about said support means to effect elevation of said receiver relative to said support means, and means for rotating said receiver with respect to said bolster means when said receiver is in elevated position in the direction of said support means to effect dumping of said vehicle on the opposite side of said support means, said bolster means being connected to said receiver at a point spaced below the top of said vehicle a distance not less than the distance between the pivotal connections of said bolster to said support means and said receiver.

3. Apparatus for dumping a vehicle comprising a base,
an elongated vehicle receiver on said base including a vehicle supporting deck,
a pair of stanchion means extending upwardly from said deck one along each longitudinal edge thereof,
vehicle hold down means mounted on said stanchions movable between a clamping position holding said vehicle against said deck and an elevated position above a vehicle to permit movement of a vehicle on and off said deck,
a pair of bolsters pivotally connected to one of said stanchion means,
rigid support means adjacent said one stanchion means pivotally supporting said bolsters,
means for causing rotation of said bolsters about their connection to said support means,
and means for causing rotation of said receiver relative to said bolsters about the connection thereof to said one stanchion means.

4. Railcar dumping apparatus comprising a base,
an elongated railcar receiver on said base including a deck having rails thereon extending the length thereof for supporting a rail car,
a pair of stanchion means extending upwardly from said deck one along each longitudinal edge thereof,
railcar hold down means mounted on said stanchion means movable between a clamping position holding said railcar against said deck rails and an elevated position above a railcar to permit movement of a railcar on and off said deck,
a pair of bolsters pivotally connected at one end thereof to said one stanchion means at a point spaced above said rails,
rigid support means adjacent said one stanchion means pivotally supporting said bolsters at an elevation above said rails,
lift cylinders extending between said base and said bolsters for causing rotation of said bolsters about their connection to said support means,
and tilt cylinders extending between said bolsters and said deck for causing rotation of said receiver about the connection thereof to bolsters.

5. Apparatus according to claim 4 including means mounting said rails for movement towards and away from the stanchion means along one edge of said deck.

* * * * *